United States Patent [19]

Holland et al.

[11] 4,351,273
[45] Sep. 28, 1982

[54] MOVABLE CHICK GUARD

[75] Inventors: Eddie L. Holland, Cumming; Charles K. Stallings, Lilburn; Jack Parker, Roswell, all of Ga.

[73] Assignee: U.S. Industries, Inc., New York, N.Y.

[21] Appl. No.: 226,914

[22] Filed: Jan. 21, 1981

[51] Int. Cl.$^3$ .............................................. A01K 39/01
[52] U.S. Cl. ............................. 119/51 R; 119/51 CF; 119/52 AF
[58] Field of Search ........... 119/51 R, 52 AF, 51 CF; 198/729

[56] References Cited

U.S. PATENT DOCUMENTS

| | | | |
|---|---|---|---|
| 3,077,182 | 2/1963 | Jordan | 119/51 R X |
| 3,097,735 | 7/1963 | Siciliano | 198/729 |
| 3,285,230 | 11/1966 | Van Huis et al. | 119/51 R |

*Primary Examiner*—Hugh R. Chamblee
*Attorney, Agent, or Firm*—Price, Heneveld, Huizenga & Cooper

[57] ABSTRACT

A movable chick guard adapted for use with a conveyor feeder of the type having a conveying chain movable in a feed trough, includes a bracket, an elongated kicker member having an upturned forward end, and a depending leg member secured at the rear end of the kicker member to the bracket. The kicker member is pivotally secured to the bracket for movement between a first position at which it rides on the conveying chain to kick small chicks off the conveying chain and a second position at which it lies on a conveyor corner housing. When in the second position, the kicker member tends to keep mature chickens from sitting on the housing and the depending leg member blocks the opening to the housing.

7 Claims, 5 Drawing Figures

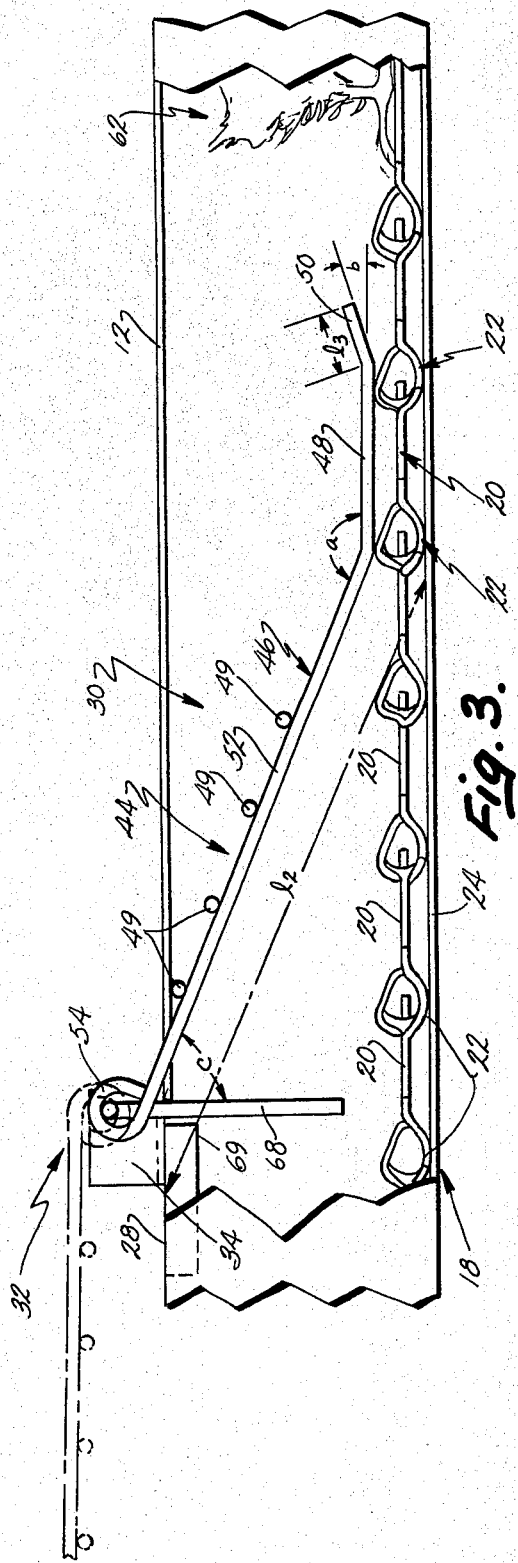

MOVABLE CHICK GUARD

BACKGROUND OF THE INVENTION

The present invention relates to animal feeding devices and more particularly to a guard for an automated feeding system which prevents chicks from becoming caught in the feeding mechanism.

In the feeding of animal stock such as poultry, chain-type feed conveyors are frequently employed. These conveyors typically include elongated troughs joined to corner structures. An elongated conveying chain is disposed within the troughs and passes through the corner structures which house sprockets. The conveying chain pulls and pushes feed along on the open conveyor trough to fill it and provide feeding access to the poultry. An example of such a chain-type feed conveyor and corner construction may be found in U.S. Pat. No. 3,147,853, entitled CORNER POST ASSEMBLY and issued on Sept. 8, 1964, to Van Huis.

When employing chain-type feed conveyors to feed poultry, a problem has been experienced with the small chicks riding on the conveying chain. When chicks ride on the chain or feed in close proximity to the corner constructions or portions of the feeder, they can become hung up in the chain and subsequently entrained into the corner housing. This, of course, may have fatal results to the chicks. After approximately three weeks, the chicks mature to such an extent that they are too large to fit into the feed troughs and ride on a chain. At this stage in development, the more mature chickens tend to sit on and feed from the corner housings of the feed system.

In an attempt to keep small chicks from riding on the conveying chain, it has been proposed to provide a reciprocating chick guard which includes an actuating arm and a reciprocating kicker member. The loose interconnection of the components of the reciprocating chick guard and their rapid agitation about the chain causes noise which frightens the chicks away from the mechanism. This reduces the danger of the chicks being caught in the corner assembly. An example of such a guard may be found in U.S. Pat. No. 3,285,230, entitled RECIPROCATING CHICK GUARD FOR CONVEYOR-FEEDER CORNER and issued on Nov. 15, 1966, to Van Huis et al.

Prior chick guards, due to their rigid and platelike construction, have permitted the birds to catch their feet as the birds mature. Also, the rigid construction prevents shavings, feathers, litter and the like from being transported along the trough by the chain when the birds are not being fed. Further, prior chain guards have not attempted to prevent the perching of more mature chickens on the corner housings.

SUMMARY OF THE INVENTION

In accordance with the present invention, a unique chick guard is provided which prevents chicks from being caught in the corner housing of a chain feeder, which is designed to discourage perching by more mature chickens on the corner housing and which permits shavings, feathers, litter and the like to be moved by the conveying chain. Essentially, the guard includes an elongated kicker member having an upturned forward end portion and a rearwardly extending elongated portion. A depending leg member is secured adjacent the rear end of the kicker member. Provision is made for pivotally securing the kicker member at its rear end to the corner housing. The kicker member is configured to ride on the feed conveyor to "kick" small chicks off the conveying chain. The kicker member may be pivoted rearwardly until it lies on the corner housing. When so positioned, the kicker member tends to keep mature chickens from perching on the housing.

In narrower aspects of the invention, the kicker member includes a plurality of equally spaced, elongated, parallel wire members which are interconnected by a plurality of transversely extending wire members. Each of the elongated wire members includes an intermediate portion dimensioned to ride on the feed chain and which has a length at least equal to the longitudinal dimension of one link of the conveyor chain. The depending leg member of the guard includes a plurality of generally straight elongated prongs or wires which are secured to a bracket in a spaced parallel relationship to each other and intermediate the spacing between the elongated parallel wire members of the kicker. The open or "mesh" construction of the guard permits shavings, feathers, litter and the like to pass by the guard. Problems heretofore experienced with blockage of such material by the chick guard are eliminated.

The configuration of the elongated parallel wire members and the manner by which they rest on the chain eliminates problems heretofore experienced with the feet of the chicks being caught in the guard. When the chicks are approximately three weeks old, the guard may be pivoted so that it rests on the corner housing. The depending leg member extends downwardly and discourages and/or prevents the mature chickens from perching on the corner housing and attempting to feed from the trough.

BRIEF DESCRIPTION OF THE DRAWINGS

FIG. 3 is a fragmentary, side elevational view of the chick guard installed in the feed conveyor;

FIG. 4 is a fragmentary, top plan view of the chick guard installed in the feeder.

DETAILED DESCRIPTION OF THE PREFERRED EMBODIMENT

Figure 1:
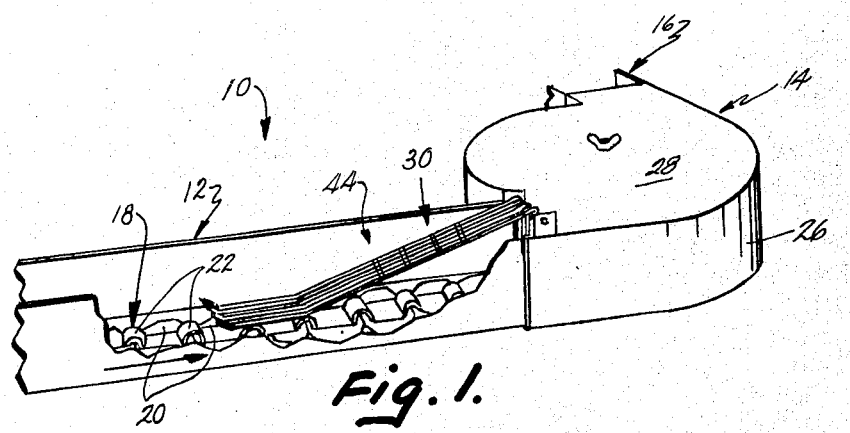
FIG. 1 is a perspective, fragmentary view of a portion of the conveyor feeder which includes the chick guard in accordance with the present invention.

With reference to the drawings, FIG. 1 illustrates a portion of a chain-type feed conveyor primarily adapted for use in feeding poultry. The conveyor or automatic feeder is generally designated 10 and includes a trough section 12, a corner construction generally designated 14 and another trough section 16. Feed is conveyed through trough sections 12, 16 by an elongated chain 18. Chain 18 includes a plurality of longitudinally extending links 20 interconnected by protruding hook portions 22. This is best seen in FIG. 3. Chain 18 rides on or adjacent a bottom surface 24 of the feed trough sections 12, 16. The corner construction 14 is, for example, of the general type disclosed in the aforementioned U.S. Pat. No. 3,147,853. The corner 14 includes a housing 26 having a top or cover 28. A sprocket (not shown), rotatably mounted within the housing 26, engages the chain.

Figure 5:
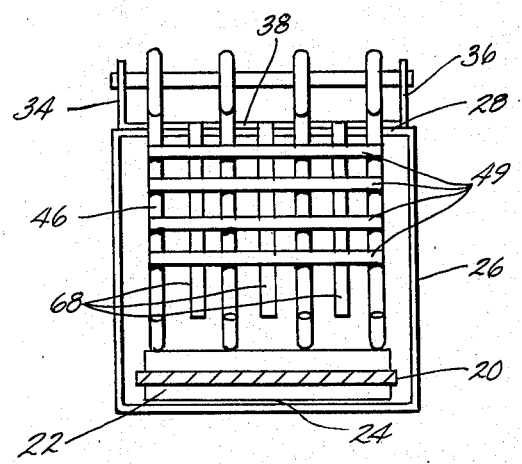
FIG. 5 is a cross-sectional view taken generally along line V—V of FIG. 4 and showing a front, elevational view of the chick guard.

In accordance with the present invention, a unique chick guard generally designated 30 is secured to cover 28 of the corner construction or assembly 14. As best seen in FIGS. 3, 4 and 5, chick guard 30 includes a bracket 32 defined by end members 34, 36. End members 34, 36, as seen in FIGS. 3 and 4, may be joined to a transversely extending base portion 38 which is secured to top or cover 28 of corner assembly 14.

Pivotally secured to the bracket is a chick kicker member generally designated 44. Kicker member 44 includes a plurality of elongated, parallel wire members 46. In the preferred embodiment illustrated, four such wire members are included. Each wire member 46 includes an intermediate portion 48, an upturned forward end portion 50 and a rearwardly extending, elongated portion 52. Portion 52 intersects portion 48 at an angle designated "a" in FIG. 3. Angle "a" is greater than 90° and, in the embodiment illustrated, is equal to approximately 160°. Forward end portion 50 intersects with intermediate portion 48 at an angle designated "b" in FIG. 3. In the preferred embodiment, angle "b" is approximately 15°.

As is clearly seen in FIGS. 1 and 3, intermediate portion 48 has a length $l_1$ at least equal to the longitudinal dimension of a chain link 20. The points where the intermediate portion joins with portions 50, 52 are on top of the interconnecting hook portions 22 of immediately adjacent links. The forward portion 50 of each wire member is upturned to prevent the kicker from jamming in chain 18.

Wire members 46 are interconnected by transverse wires 49. Wires 49 extend in spaced parallel relationship to one another and are secured to members 46 within portions 52.

Each wire member 46 terminates at a rearward end in a closed loop 54. Extending through each of the loops 54 is another transverse or pivot member designated 56. Member 56 also extends through suitable apertures 60 defined by side members 34, 36 of bracket 32 and may be secured to the bracket.

Figure 2:
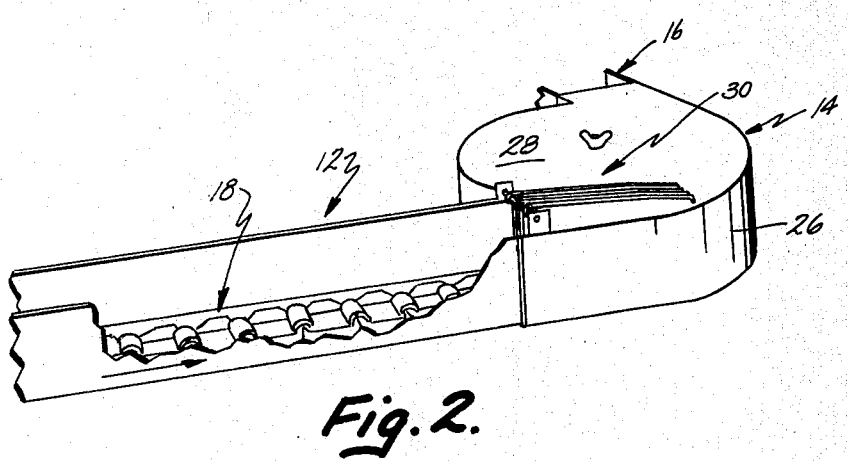
FIG. 2 is a fragmentary, perspective view of a portion of the conveyor feeder showing the chick guard pivoted to its second position.

Kicker member 30 may be pivoted about the bracket 32 from a first position, illustrated in FIGS. 1 and 3, to a second position, illustrated in FIG. 2. When in the position illustrated in FIG. 3, the kicker member is positioned to "kick" a chick generally designated 62 which is riding on chain 18 within the trough section 12. Transverse wire members 49, which interconnect the parallel elongated wire members 46, are positioned completely within portions 52 of the wires 46. As is clear from FIG. 4, when a chick approaches the guard, the space between wires 46 at the intermediate and forward portions is open. The chick will be contacted by the wires and "forced" or scared off chain 18. Since the space between the members 46 is open, the danger of trapping the chick in the guard is reduced. Further, the "open" construction of the guard prevents trapping or blockage of shavings, litter, feathers and the like which may become deposited in the trough. Such material may be moved by the chain 18 past the guard.

As best seen in FIGS. 3, 4 and 5, a depending leg member defined by a plurality of elongated prongs or wires 68 is secured to bracket 32 at the rear end of the kicker member 44. Each of the prongs 68 is welded or otherwise suitably secured to base 38 at apertures 69 of bracket 32. As shown in FIG. 3, when the guard is in its first position and portion 48 extends horizontal or parallel with bottom wall 24 of the trough, prongs 68 extend perpendicular to the bottom 24 of the trough. The prongs assume an angle designated "c" in FIG. 3 with respect to each of the wire members 46. In the presently preferred embodiment, angle "c" is approximately 70°. Also, as seen in FIGS. 4 and 5, prongs 68 are equally spaced with respect to each other and are positioned intermediate the elongated wires 46.

As previously mentioned, when the chicks mature sufficiently so that they do not fit within the feed trough 12, the guard may be pivoted from its first position to the second position illustrated in FIG. 2 and shown in phantom in FIG. 3. When in the second position, the kicker member rests on the top or cover 28 of corner housing 26. Depending prongs 68 extend downwardly immediately adjacent the opening into housing 26. These prongs prevent or discourage more mature chickens from perching or sitting on corner 14 to feed from trough 12. The prongs prevent the birds from sticking their heads into housing 26 since they block the opening.

In a presently existing embodiment of the chick guard in accordance with the present invention, each of the wire members 46 haven an outside diameter of approximately 9/64 of an inch. Wire or pivot member 56 has a diameter of approximately 9/32 of an inch. The length $l_1$ of the intermediate portion 48 is approximately 2 inches, the length $l_2$ of portion 52 (FIG. 3) is approximately 6.8 inches and the length $l_3$ of the upturned forward portion 50 is approximately $\frac{1}{4}$ inch. Each depending prong or wire member 68 has a length of approximately 1.75 inches and a diameter of approximately 11/64 of an inch. Transverse wire members 49 are spaced at approximately 1 inch intervals from the terminal portion of the loops 54. Members 49 have a diameter of approximately 9/64 of an inch. Wires 46 are positioned so that the total transverse dimension or width $w_1$ (FIG. 4) of the kicker member is approximately $2\frac{1}{4}$ inches.

In view of the foregoing description, those of ordinary skill in the art will undoubtedly envision various modifications which would not depart from the inventive concepts disclosed herein. For example, the precise positioning and dimensioning of the various elements of the chick guard could be varied somewhat from that shown while obtaining the same or similar results. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows.

1. A guard for a conveyor feeder of the type having a conveying chain movable in a feed trough and into a housing, said guard comprising:
   a bracket;
   an elongated kicker member having an upturned forward end, a rearwardly extending elongated portion which is angled with respect to said forward portion and a rear end; and
   means for movably connecting said kicker member at its rear end to said bracket so that said bracket may be attached to a conveyor corner housing and the kicker member will ride on a feed conveyor to kick small chicks off the feed conveying chain and the kicker member may be moved rearwardly until it lies on the housing to keep more mature chickens from sitting on the housing, said kicker member comprising a plurality of elongated parallel wire members interconnected by a plurality of transversely extending wire members, each of said elongated parallel wire members including an intermediate portion, a rearwardly extending portion intersecting said intermediate portion at an angle "a" greater than 90° and a forward portion intersecting said intermediate portion at an angle "b" less than 90°, and wherein said intermediate portion of each of said elongated parallel wire members has a length $l_1$ at least equal to the longitudinal dimension of a link of the conveying chain.

2. A guard as defined by claim 1 further including a depending leg member at said bracket and adapted to extend into the feed trough to prevent mature chickens from sticking their heads into the housing.

3. A guard as defined by claim 1 wherein each rearwardly extending portion of said elongated parallel wire members terminate in a loop and wherein said means for movably connecting said kicker member includes a transverse wire member carried by said bracket and extending through said loops.

4. A guard as defined by claim 1 further including a depending leg member secured to said bracket and adapted to extend into said feed trough, said depending leg member comprising:
a plurality of generally straight, elongated prongs secured to said bracket in spaced parallel relationship to each other.

5. A guard as defined by claim 4 wherein said prongs extend relative to said rearwardly extending portion of each of said parallel wire members at an angle "c" greater than 45°.

6. A guard as defined by claim 5 wherein each rearwardly extending portion of said elongated parallel wire members terminate in a loop and wherein said means for movably connecting said kicker member includes a transverse wire member carried by said bracket and extending through said loops.

7. A guard as defined by claim 6 wherein said prongs are positioned intermediate said elongated parallel wire members.

* * * * *